P. LANE.
Hog-Traps.

No. 158,950.  Patented Jan. 19, 1875.

UNITED STATES PATENT OFFICE.

PETER LANE, OF ELWOOD, INDIANA.

IMPROVEMENT IN HOG-TRAPS.

Specification forming part of Letters Patent No. 158,950, dated January 19, 1875; application filed August 15, 1874.

*To all whom it may concern:*

Figure 1:
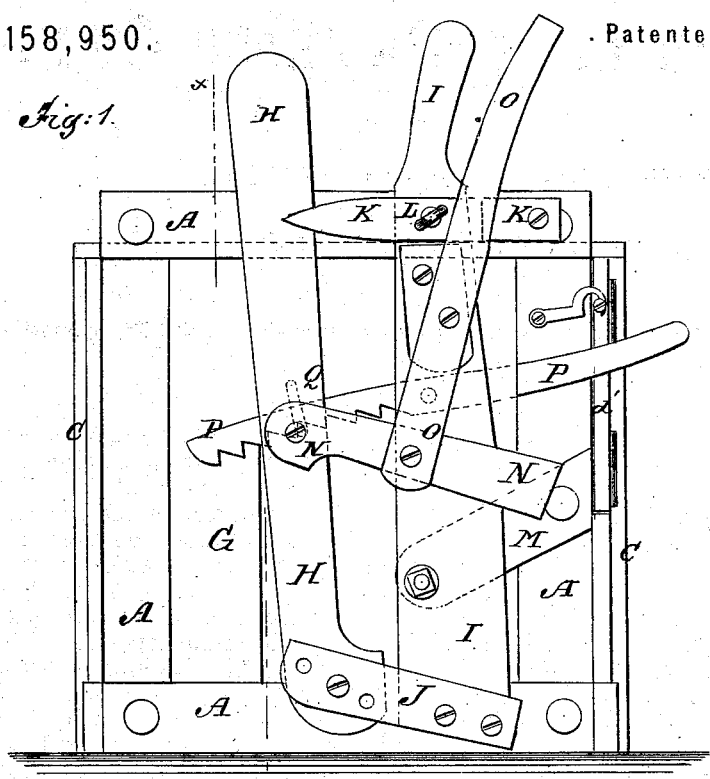
Figure 2:
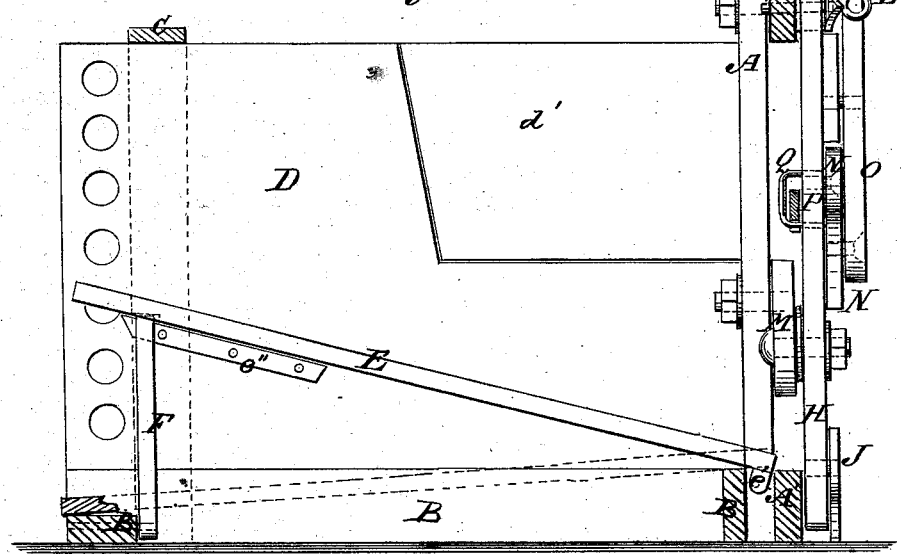

Be it known that I, PETER LANE, of Elwood, Madison county, Indiana, have invented a new and useful Improvement in Combined Hog and Cattle Trap, of which the following is a specification:

Figure 1 is a front view of my improved hog-trap, and Fig. 2 is a longitudinal section of the same, taken through the line $x\ x$, Fig. 1.

My invention is an improvement upon the hog-trap for which Letters Patent were granted to Overshiner, May 19, 1874, No. 151,048.

The improvement relates to the manner of pivoting the clamping-levers together and to the frame of the trap; also, the means of operating said levers and holding them locked together, as hereinafter set forth.

A represents the front frame of the trap, which consists of two posts, connected at their upper and lower ends by two cross-bars. B is the base-frame, and C is the rear-end frame. D are the sides of the trap, which rest upon the base-frame B, and are secured to the posts of the front and rear frames A C. In the rear ends of the sides D are formed holes to receive cross-bars to confine the hogs in the trap, and which may be conveniently taken down to allow the hogs to be driven in. In the upper forward part of the right-hand side of the trap, as seen in Fig. 1, is formed a door, $d'$, to give the operator free access to the hogs while being held, without its being necessary to enter the trap. E is the spaying-table, which, when lowered, forms a part of the floor of the trap. To the lower side of the forward end of the table E is attached a cleat, $e^1$, which enters a slot in the base-frame, and thus keeps the said table from being drawn out of place. The rear part of the table E is supported by a leg, F, pivoted to the rear bar of the base-frame B, so that it can be turned down out of the way when not required for use. The table E may receive additional support from an inclined cleat, $e^2$, attached to the side of the trap, and upon which the outer side edge of said table rests. The left-hand part of the front of the trap is closely closed by one or more boards, G, attached to the front frame A. The right-hand part of the front of the trap is closed by two wide levers, H I, the lower ends of which are connected by an iron strap, J, which is rigidly attached to the lower end of the lever I, and to which the lower end of the lever H is pivoted. The upper ends of the levers H I, when raised into an upright position, enter a catch or half-keeper, K, attached to the top bar of the front frame A, near its right-hand end, and in this position the upper end of the lever I is secured by a pin, L, which passes through the keeper K, lever I, and into or through the top bar of the frame A, or by a hook or spring-latch. The lever I is pivoted near its lower end to an arm, M, rigidly attached to the right-hand post of the frame A. To the middle part of the lever H is pivoted the end of a connecting-bar, N, to which is pivoted the lower end of the lever O. The lever O is pivoted to the lever I near its upper part, and its upper end projects into such a position that it can be conveniently reached and operated to move the upper end of the lever H from or toward the lever I. The lower ends of the levers H I are so arranged that, when their upper ends are close together, there may be space enough between their lower parts to receive the neck of a hog. This space may also be obtained by cutting away a part of one or both of said levers H I. P is a latch, which is pivoted to the lever I, and has notches formed upon the lower edge of the left-hand end to catch upon the staple or keeper Q, through which it passes, and which is attached to the lever H, to prevent the levers H I from being pushed apart by the struggles of the animal. The right-hand end of the latch P projects into such a position that it may be conveniently reached and operated to release the animal, when desired. In using the trap, the animals to be operated upon are driven into the trap and the rear end of said trap is closed. The lever O and latch P are then operated to spread the levers H I sufficiently to allow the animal, in seeking to escape, to thrust her head between said levers, at which time the lever O is operated to draw the levers H I close enough together to prevent the animal from withdrawing her head, the latch P holding them securely in position.

When the animal is to be spayed, the pin L is withdrawn, and the levers H I and their attachments are turned down to the left, throwing the animal upon her side upon the movable part E of the floor. The rear end of the table E is then raised, bringing the animal into such a position that the operation can be readily performed through the doorway $d'$. The levers H I being connected at the bottom, when open they diverge or incline outward from that point, instead of from the top. Being also pivoted to the bar M, they turn thereon, and, when in the horizontal position, close the lower front end of the trap. The levers are easily brought together by the lever N O, and held secure or readily released by the detent or ratchet lever P. When the spaying or other operation is complete, the levers may be readily unlocked and the hog released by raising the free end of lever I, without the necessity of first raising both levers to a vertical position.

Having thus described my invention, I claim as new and desire to secure by Letters Patent—

A hog-trap, comprising the levers H I, connected at the bottom, and one of them pivoted to bar M, the lever N O, ratchet-lever P, and staple Q, serving as means of connection and adjustment of the upper portion of said levers, all combined and arranged as shown and described, to operate as specified.

PETER LANE.

Witnesses:
SAMUEL FLEMING,
D. N. ADAMS.